United States Patent

[11] 3,628,554

| [72] | Inventor | Alexander J. Wilson<br>Warwickshire, England |
|---|---|---|
| [21] | Appl. No. | 843,394 |
| [22] | Filed | July 22, 1969 |
| [45] | Patented | Dec. 21, 1971 |
| [73] | Assignee | Girling Limited<br>Birmingham, England |
| [32] | Priority | Aug. 17, 1968 |
| [33] | | Great Britain |
| [31] | | 39,449/68 |

[54] FLUID PRESSURE CONTROL VALVE
3 Claims, 5 Drawing Figs.

[52] U.S. Cl.................................................... 137/85, 137/596.18
[51] Int. Cl.................................................... F15b 5/00, G05d 16/00
[50] Field of Search............................................ 137/85, 82, 56, 116.5, 627.5, 596.18

[56] References Cited
UNITED STATES PATENTS

| 2,720,887 | 10/1955 | Safford.......................... | 137/116.5 |
| 2,806,481 | 9/1957 | Faust............................. | 137/116.5 |
| 2,964,051 | 12/1960 | Garnett......................... | 137/85 |
| 2,981,280 | 4/1961 | Cornelius...................... | 137/116.5 X |
| 2,984,216 | 5/1961 | Greenlees..................... | 137/85 X |
| 3,310,350 | 3/1967 | Wilson ......................... | 137/627.5 X |

Primary Examiner—Alan Cohan
Attorney—Scrivener, Parker, Scrivener and Clarke

ABSTRACT: In a valve for controlling relative fluid pressures in first and second spaces of the type described in my U.S. Pat. No. 3,310,350, means are incorporated to control the rate of pressure buildup on the side of the second control member which is subjected to a pressure different from that in the first space.

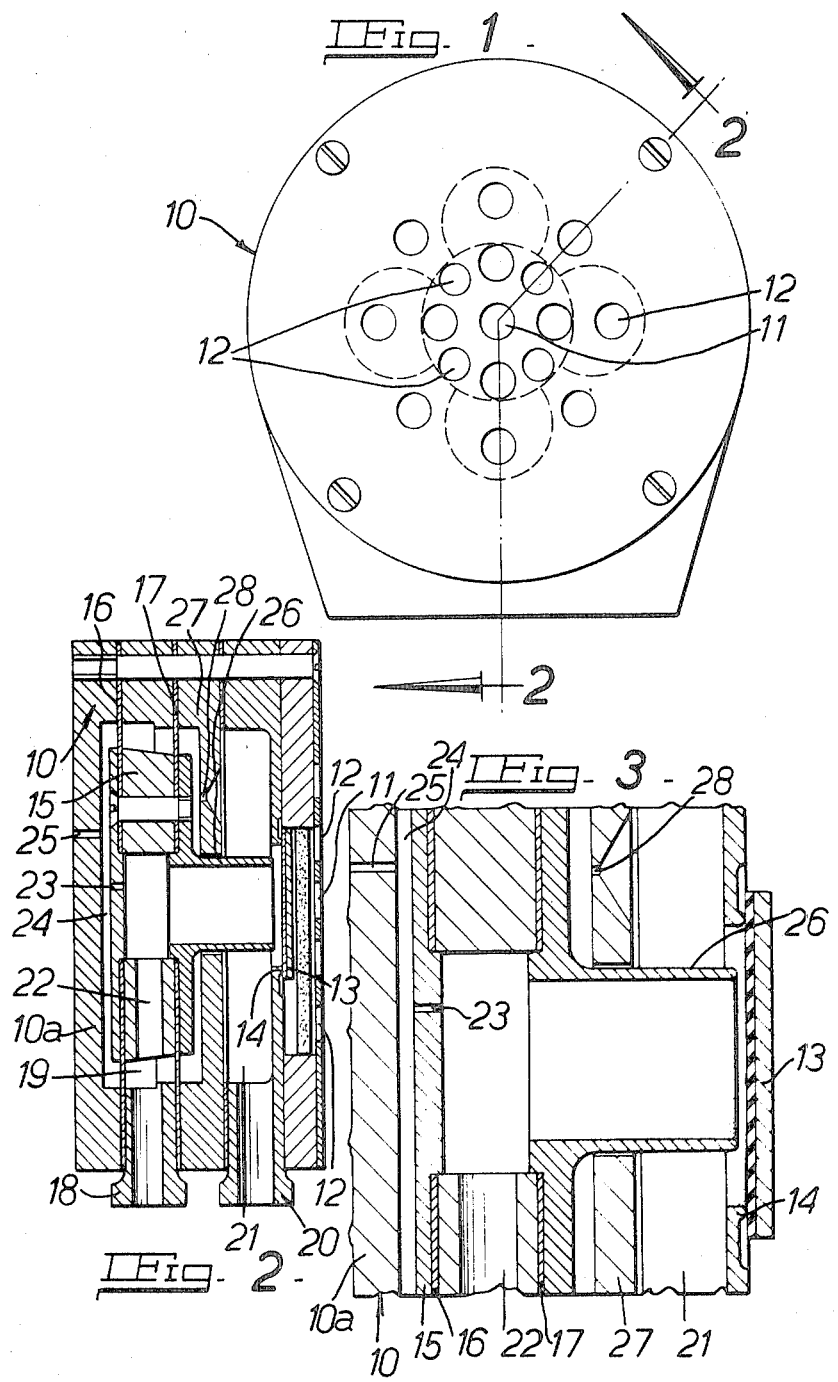

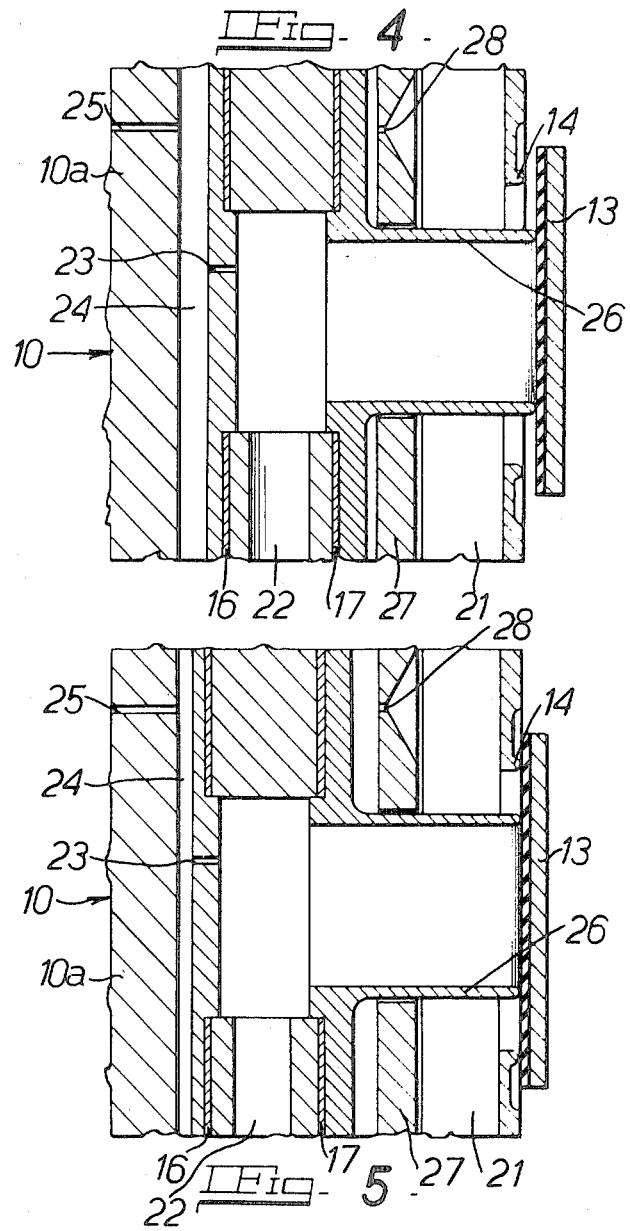

3,628,554

FLUID PRESSURE CONTROL VALVE

This invention relates to an improved valve for controlling relative fluid pressure in two spaces or chambers.

In my U.S. Pat. No. 3,310,350, assigned to Girling Limited, I have described and claimed a valve for controlling relative fluid pressure in first and second spaces, comprising a housing, first and second spaced control members in the housing, a first valve member connected to said first and second control members, a seating in the housing on the side of said second control member remote from said first control member, means providing communication respectively between said first space and said housing between said control members, and between said second space and said housing between said second control member and said seating, a second valve member engageable by said first valve member to cut off communication between the spaces when the first valve member is moved in response to an actuating fluid pressure, the second valve member then being moved away from the seating to connect the second pressure space to a fluid pressure different from the pressure in the first space, means biassing said second valve member towards said seating, and means normally biassing said first valve member away from said second valve member.

When the first space is connected to a source of vacuum, in a normal inoperative position spaces in the housing on opposite sides of the second control member are subjected to vacuum. Upon application of the actuating fluid pressure, the second valve member is moved away from the seating by the cooperation with it of the first valve member, and air rapidly enters the space in the housing between the second control member and the seating and acts on the second control member causing the first valve member to move in the opposite direction away from the second valve member. This movement continues until it is resisted and finally overcome by actuating fluid pressure acting on the face of the first control member remote from the second valve member, whereafter the first valve member is moved again in the normal forward direction. There is therefore a tendency for the valve to "oscillate" or "hunt" which my present invention seeks to overcome or eliminate substantially.

According to my present invention in a valve for controlling relative fluid pressures as claimed in my U.S. Pat. No. 3,310,350 means are incorporated to control the rate of pressure build up on the side of the second control member which is subjected to a fluid pressure different from that in the first space.

In one form these means comprise a plate located in the housing between the second control member and the seating with which the second valve member is adapted to cooperate, the plate being provided with at least one orifice adapted to restrict the rate at which pressure on the said side of the second control member builds up when the valve is operated.

One embodiment of our invention is shown in the accompanying drawing in which:

FIG. 1 is an end elevation of a valve for controlling relative pressures in two spaces or chambers;

FIG. 2 is a section on the line 2—2 of FIG. 1 showing the valve in an inoperative closed position; and FIGS. 3, 4, and 5 show on an enlarged scale, the position assumed by the valve in the closed, an open and a dwell position respectively.

In the valve illustrated in the drawings 10 is a housing open at one end to atmosphere through a central port 11 and a series of ports 12 angularly spaced on pitch circles of constant diameter. A plate valve 13, urged by a spring (not shown) against an annular seating 14 in the housing normally closes communication between atmosphere and the interior of the housing 10. A hollow floating cup shaped valve member 15 is supported within the housing 10 by spaced diaphragms 16 and 17. An inlet connection 18 for vacuum supply is connected to a space 19 between the diaphragms 16 and 17, and an outlet connection 20 is connected to a space 21 in the housing between the diaphragm 17 and the plate valve 13. Orifices 22 and 23 in the valve member 15 connect the space 19 between the diaphragms 16 and 17 with a space 24 between the diaphragm 16 and an adjacent end wall 10a of the housing 10 in which a passage 25 is located for the admission of air from a control device. A spring (not shown) normally holds the valve member 15 in the position shown in FIG. 2 in which it is spaced from the plate valve 13 and the inlet connection 18 is in communication with the outlet connection 20 through the orifice 22 in the valve member 15.

The valve member 15 is provided with an axially extending hollow stem 26 which works through a central opening in an annular flange 27 located in the space 21 in the housing. The flange 27 extends radially inwards from the wall of the housing 10 and is provided with an orifice 28.

When air is admitted to the housing 10 through the passage 25, and when the rate of incoming air is greater than the flow of air through the orifice 23, a pressure difference is created across the diaphragm 16 and the valve member 15 moves to the right. The outer end of the stem 26 of the valve member 15 first engages the plate valve 13 to cut off communication between the inlet connection 18 and the outlet connection 20, and then moves the plate valve 13 away from its seating 14 to permit air to enter the space 21 and connect the outlet connection 20 to the atmosphere past the interior of the stem 26 (FIG. 4). Air continues to flow into the space 21 and bleed through the orifice 28, acting on the diaphragm 17 until this pressure is sufficient to balance the actuating fluid pressure applied to the diaphragm 16 through the passage 25.

The pressure in the space 21 when this balanced value is attained is chosen to be the pressure required to actuate a servo unit connected to the outlet connection 20.

A reduction in the effective size of the passage 25 causes the pressure acting on the diaphragm 16 to decrease by an amount sufficient to allow the valve member 15 to move in the opposite direction away from the plate valve 12 and effect a reduction in pressure in the space 21 which is momentarily connected through the valve member 15 to the space 19. Since the space 19 is permanently connected to the vacuum supply the pressure in the space 21 is proportional to the pressure in the space 24 and the valve assumes the dwell position shown in FIG. 5.

When the passage 25 is completely closed, the pressure in the space 24 acting on the diaphragm 16 bleeds through the orifice 23.

The pressure in the space 21 acts on the diaphragm 17 to move the valve member 25 in the opposite direction out of engagement with the plate valve 13. The inlet and outlet connections 18 and 20 are thereafter reconnected through the orifice 22 in the valve member 25.

The provision of the orifice 28 in the flange 27 controls the rate at which the output pressure in the space 21 is built up thereby preventing oscillation of the valve member 25 in operation.

I claim:

1. A valve for controlling relative fluid pressure in first and second spaces, comprising a housing, first and second control members in the housing, dividing the housing into a first chamber adjacent the first control member, a second chamber between the members, and a third chamber adjacent the second control member, a first valve member connected to said first and second control members, means providing communication respectively between said first space and said second chamber, between said second space and said third chamber, between an actuating fluid pressure and said first chamber and between a fluid pressure different from the pressure in the first space and said third chamber, said last mentioned communication means being provided with a seating, first and second control means providing restricted communication respectively between said first chamber and said second chamber, and between said third chamber and said second control member, a second valve member associated with said seating and engageable by said first valve member to cut off communication between said second and third chambers, and first and second means for biassing respectively said first valve member away from said second valve member and said second valve member towards said seating, whereby in operation, actuating fluid pressure sufficient to cause a pressure drop across the first control means, moves the first valve member to engage the second valve member to isolate the two spaces, the second valve member then being moved away from the seating to connect the second pressure space to a fluid pressure different from the pressure in the first space, the second control means controlling the rate at which the second control means controlling the rate at which the second control member is subjected to the change in pressure.

2. A valve as claimed in claim 1, wherein the first and second control members are diaphragms, the first valve member comprises a hollow body open at an end adjacent to the second valve member and having a port connecting the interior of the hollow body to the second chamber, and the first control means is an orifice in an opposite end of the body.

3. A valve as claimed in claim 2, wherein the second control means comprises a plate located in the third chamber isolating the second control member from the seating and the second space, the hollow body of the first valve member working through an opening in the plate, and the plate is provided with at least one orifice adapted to restrict the rate at which the second control member is subjected to a change in pressure.

* * * * *